United States Patent
Hung et al.

(10) Patent No.: US 11,653,092 B2
(45) Date of Patent: May 16, 2023

(54) COMPENSATION-FREE PHASE DETECTION FOR PHASE DETECTION AUTOFOCUS DEVICES

(71) Applicant: ADVANCED MICRO DEVICES, INC., Santa Clara, CA (US)

(72) Inventors: Wei-Chih Hung, Hsinchu (TW); Po-Min Wang, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/485,874

(22) Filed: Sep. 27, 2021

(65) Prior Publication Data
US 2023/0113983 A1  Apr. 13, 2023

(51) Int. Cl.
*H04N 5/232* (2006.01)
*H04N 5/369* (2011.01)

(52) U.S. Cl.
CPC ... *H04N 5/232122* (2018.08); *H04N 5/36961* (2018.08)

(58) Field of Classification Search
None
See application file for complete search history.

(56) References Cited

U.S. PATENT DOCUMENTS

| | | | |
|---|---|---|---|
| 11,314,150 B2 * | 4/2022 | Galor Gluskin | ............................ H04N 5/232122 |
| 2017/0187948 A1 * | 6/2017 | Wang | ...................... G02B 5/201 |
| 2021/0337128 A1 * | 10/2021 | Cui | .................. H01L 27/14627 |

* cited by examiner

*Primary Examiner* — Cynthia Segura

(57) ABSTRACT

Enhanced phase detection for a PDAF sensor includes extracting pixel data from image data, the image data captured from an image capturing device having a phase detection autofocus (PDAF) sensor; extracting one or more features from the pixel data, including removing irrelevant pixel data; and determining a phase difference between the one or more features.

20 Claims, 8 Drawing Sheets

COMPENSATION-FREE PHASE DETECTION FOR PHASE DETECTION AUTOFOCUS DEVICES

BACKGROUND

Modern image capturing devices, such as digital cameras, often include auto focus (AF) to aid the image capturing device to focus upon an intended object. There are a variety of different techniques for performing autofocus such as, for example, phase detection autofocus (PDAF). Additionally, image capturing devices can include image sensors to assist with autofocusing an image. Some image capturing devices can use particular types of sensors. For example, some image capturing devices use PDAF sensors to perform autofocus.

DETAILED DESCRIPTION

Figure 1:
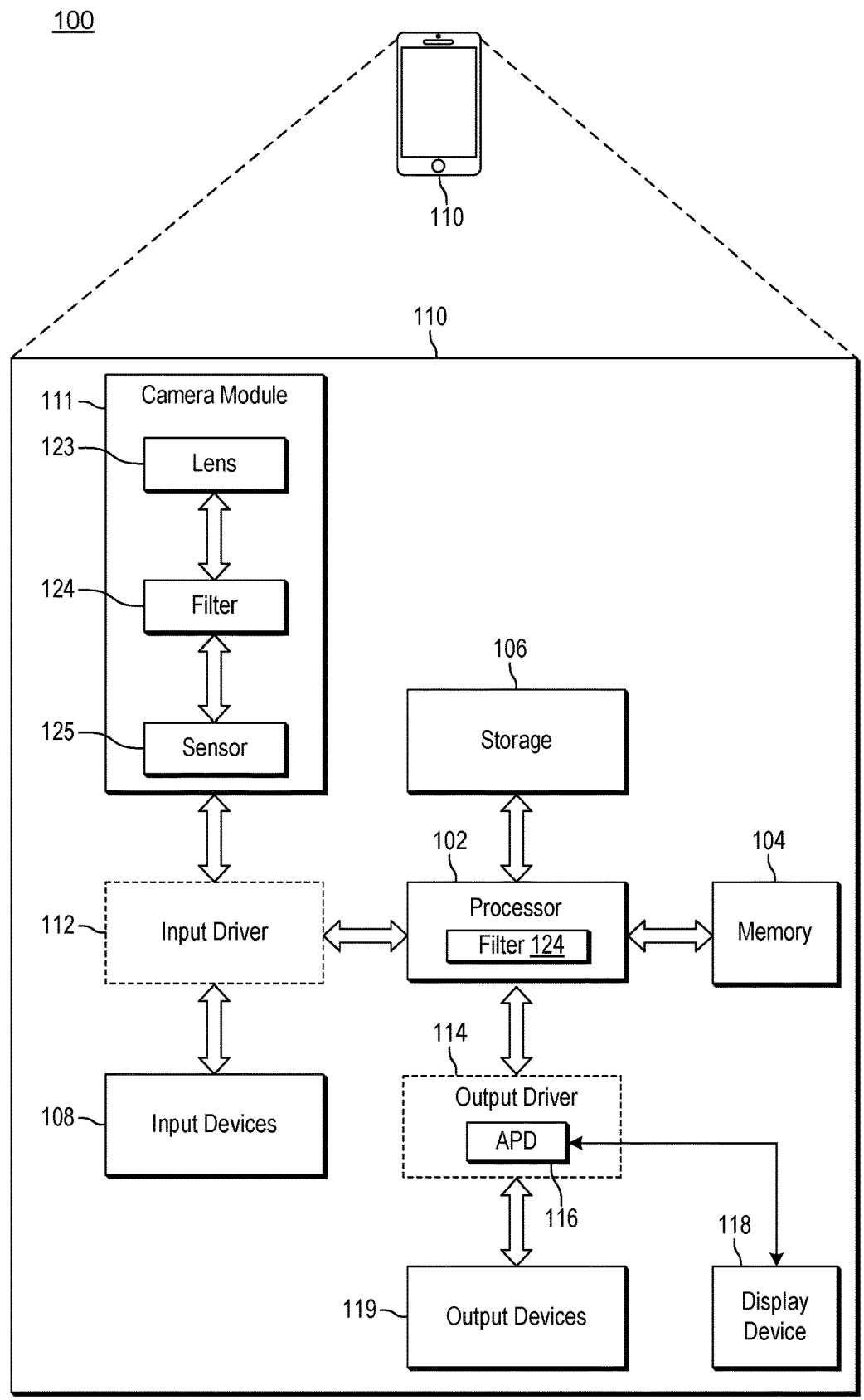
FIG. 1 sets forth a block diagram of an example system for providing enhanced phase detection in an image capturing device accordance with some implementations of the present disclosure.

As previously mentioned, autofocusing can be performed using phase detection autofocus (PDAF). PDAF is enabled by 'focus pixels.' Focus pixels are pixels on a sensor grid and are used for focusing rather than on capturing the image. These focus pixels can come in pairs (e.g., a left pixel and a right pixel), are positioned relatively close to each other on a sensor such that one pixel can receive light from the left (or top) part of a lens while the other pixel in the pair receives light from the opposing side (right or bottom) of the lens. (There are a variety of types of PDAF sensors such as, for example, partially masked PDAF sensors. Some PDAF sensors may have a variety of types of designs such as, for example, a PDAF sensor that has a micro-lens to separate light.) Because these pixels are positioned near to each other, the amount of light they each receive should be approximately the same. Any difference in the amount of light received between the pair of pixels can be used to determine the image is "out of focus." Said differently, if an image or signal produced from left pixel data and an image signal produced from right pixel data is different, a phase difference can be determined between the different signals. The detected phase differences can be used to perform autofocus. However, determining an accurate and correct phase difference can be compromised when irrelevant data is included in the image. Irrelevant data is data that does not form a feature intended to be captured in the image. An example of irrelevant data may be foliage in the periphery of a scene where the primary feature to be captured is a large flower. While the foliage may always be captured in an image of the larger flower, the focal point is intended to be the flower. To that end, autofocus should ignore the foliage and instead utilize on the large flower as the point or feature on which to drive the autofocus mechanism. Irrelevant data may also be noise in the pixel data that exists as a result of errors in preprocessing, errors in image sensors, variations in lens geometry, and other types of noise as will occur to readers of skill in the art.

Accordingly, implementations in accordance with the present disclosure provide a mechanism for enhanced phase detection for a PDAF sensor. In an implementation, pixel data is extracted from image data that is captured from an image capturing device having a PDAF sensor. One or more features are extracted from the pixel data that is extracted from the image data where irrelevant pixel data is removed from the pixel data extracted from the image data. A phase difference is determined between the one or more features of the pixel data extracted from the image data.

An implementation is directed to a method of providing enhanced phase detection for a PDAF sensor is disclosed. The method includes extracting pixel data from image data, the image data captured from an image capturing device having a PDAF sensor. The method also includes extracting one or more features from the pixel data extracted from the image data, where irrelevant pixel data is removed from the pixel data extracted from the image data. The method also includes determining a phase difference between the one or more features of the pixel data extracted from the image data.

In some implementations, the method also includes filtering the pixel data extracted from the image data to remove the irrelevant pixel data. In some implementations, extracting the pixel data from the image data includes extracting left pixel data and right pixel data from the image data. In some implementations, extracting the one or more features from the pixel data extracted from the image data includes extracting a feature from the left pixel data and a feature from the right pixel data prior to determining the phase difference. In some implementations, determining the phase difference includes determining the phase difference between a feature extracted from left pixel data and a feature extracted from right pixel data in an image feature domain.

In some implementations, the method also includes matching the one or more features of the pixel data extracted based on the phase difference. In some implementations, the method also includes performing left-right matching between a feature extracted from left pixel data and a feature extracted from right pixel data in an image feature domain.

Another implementation is directed to an apparatus for providing enhanced phase detection. The apparatus comprises a computer processor, a computer memory operatively coupled to the computer processor, the computer memory having disposed therein computer program instructions that, when executed by the computer processor, cause the apparatus to extract pixel data from image data, the image data captured from an image capturing device having a PDAF sensor. The computer program instructions also cause the apparatus to extract one or more features from the pixel data extracted from the image data, where irrelevant pixel data is removed from the pixel data extracted from the image data. The computer program instructions also cause the apparatus to determine a phase difference between the one or more features of the pixel data extracted from the image data.

In some implementations, the computer program instructions cause the apparatus to filter the pixel data extracted from the image data to remove the irrelevant pixel data. In some implementations, extracting the pixel data from the image data also includes extracting left pixel data and right pixel data from the image data. In some implementations, extracting the one or more features from the pixel data extracted from the image data also includes extracting a feature from the left pixel data and a feature from the right pixel data prior to determining the phase difference. In some implementations, determining the phase difference also includes determining the phase difference between a feature extracted from left pixel data and a feature extracted from right pixel data in an image feature domain.

In some implementations, the computer program instructions cause the apparatus to carry out matching the one or more features of the pixel data extracted based on the phase difference. In some implementations, the computer program instructions cause the apparatus to carry out performing left-right matching between a feature extracted from left pixel data and a feature extracted from right pixel data in an image feature domain.

Yet another implementation is directed to a computer program product for providing enhanced phase detection. The computer program product is disposed upon a computer readable medium and comprises computer program instructions that, when executed, cause a computer to extract pixel data from image data, the image data captured from an image capturing device having a PDAF sensor. The computer program instructions also cause the computer to extract one or more features from the pixel data extracted from the image data, where irrelevant pixel data is removed from the pixel data extracted from the image data. The computer program instructions also cause the computer to determine a phase difference between the one or more features of the pixel data extracted from the image data.

In some implementations, the computer program instructions also cause the computer to filter the pixel data extracted from the image data to remove the irrelevant pixel data. In some implementations, extracting the pixel data from the image data also includes extracting left pixel data and right pixel data from the image data. In some implementations, extracting the one or more features from the pixel data extracted from the image data also includes extracting a feature from the left pixel data and a feature from the right pixel data prior to determining the phase difference. In some implementations, determining the phase difference also includes determining the phase difference between a feature extracted from left pixel data and a feature extracted from right pixel data in an image feature domain.

In some implementations, the computer program instructions also cause the computer to carry out matching the one or more features of the pixel data extracted based on the phase difference. In some implementations, the computer program instructions also cause the computer to carry out carrying out the steps of performing left-right matching between a feature extracted from left pixel data and a feature extracted from right pixel data in an image feature domain.

Implementations in accordance with the present disclosure will be described in further detail beginning with FIG. 1. Like reference numerals refer to like elements throughout the specification and drawings. FIG. 1 sets forth a block diagram of an example system 100 for providing enhanced phase detection in accordance with some implementations of the present disclosure. The example system 100 of FIG. 1 can be implemented in a computing device such as a mobile device including a smart phone or tablet, a laptop computer, digital camera, and so on. More specifically, system 100 of FIG. 1 can be implemented in an image capturing device, (e.g., a camera), 110 that includes at least a lens 123 for capturing an image. The image that is captured by the lens 123 can include both visible (RGB) light and infrared (IR) light. It should be noted that additional types of light can be captured by the lens 123, but for purposes of example, visible and IR are discussed herein.

Although the image capturing device 110 has been described as a digital camera or the like, it is noted that the image capturing device 110 can include, for example, a computer, a gaming device, a handheld device, a set-top box, a television, a mobile phone (e.g., smart phone), or a tablet computer. For purposes of example herein, the example device 110 is described as an image capturing device 110, which for example is a camera. Accordingly, the image capturing device 110 includes a processor 102, a memory 104, a storage 106, one or more input devices 108, a camera module 111, and one or more output devices 119. The image capturing device 110 can also optionally include an input driver 112 and an output driver 114. It is understood that the image capturing device 110 can include additional components not shown FIG. 1.

The camera module 111 includes the lens 123 described above, a filter 124, and a sensor 125 such as, for example, a phase detection autofocus (PDAF) sensor that can provide enhanced phase detection as described herein. The PDAF sensor 125 can be used, in conjunction with the lens 123, to focus on an object of interest. The PDAF sensor 125 can be an image sensor equipped with phase detection (PD). The PD pixels are specially manufactured pixels distributed uniformly on an image sensor (e.g., the PDAF sensor 125) with a certain percentage of occupation. In one aspect, left PD pixels and right PD pixels receive light from the left and right sides of the lens 123, respectively. Phase differences generated between left PD pixels and right PD pixels can then be used for autofocusing the image capturing device 110, specifically, the lens 123, for instant (or near-instant) auto focus. It should be noted, as used herein, any reference to "left pixel" or "right pixel" may also include or reference "top pixel" or "bottom pixel." That is, any reference to "left" or "right" may in general be referencing a first side or a second side. Thus, a first side can be a left side and a second side can be a right side. Alternatively, a first side can be a top side and a second side can be a bottom side. In another variations, a first side can include both a left side and top side and the second side can include both a right side and a bottom side. Thus, reference to only "left pixel" or "right pixel" such as, for example "left pixel data" and "right pixel data" is used by way of example only. Accordingly, in some implementations, "left pixel" (or left pixel data) and "right pixel" (or right pixel data) can include or be replaced with "top pixel" (or top pixel data) and "bottom pixel" (or bottom pixel data) For example, in some implementations, PD pixels can receive light from a first side (e.g., a left side, top side, or both) and an opposite side (e.g., a right side, bottom side, or both) of the lens.

Thus, the image capturing device 110 uses the components of the camera module 111, such as the lens 123 and the PDAF sensor 125, to separate left and right light rays though the lens 123 in order to capture or 'sense' left and right images. The left and right images can be compared to each other to determine a difference (e.g., a phase difference) in the position of the left and right images on the PDAF sensor 125. The difference can be used to determine a shift (a phase shift) of a camera lens 123 for autofocus.

It should be noted that filter 124 may be included in the cameral module 111, the processor 102, or a combination of both the camera module 111 and the processor 102. FIG. 1 depicts the filter 124 in both the camera module 111 and the processor 102 by way of example only. In one aspect, the filter 124 can be hardware, software, or both. In some implementations, the filter 124 can operate as an application/software solution executed by the processor 102 to perform feature (or edge) extraction and to remove irrelevant pixels for increasing and yielding more efficient phase detection results. In some implementations, the filter 124 can operate as an application/software solution executed by the processor 102, which may be internal or external to the image capturing device. Again, other configurations can be designed for implementing and using filter 124.

In various alternatives, the processor 102 can include a central processing unit (CPU), a graphics processing unit (GPU), and even an accelerated processing units (APU), a CPU, GPU, and APU located on the same die, or one or more processor cores where each processor core can be a CPU, a GPU, or an APU. The process 102 can include filter 124. In various alternatives, the memory 104 is be located on the same die as the processor 102, or is located separately from the processor 102. The memory 104 includes a volatile or non-volatile memory, for example, random access memory (RAM), dynamic RAM, or a cache. An image signal processor (ISP) can be included in the processor 102 to perform enhanced phase detection image signal processing in the PDAF sensor 125 as described in more detail below. Alternatively, the ISP can be included in the APD 116 or as a separate processing unit (not shown). That is, although the location of the ISP is not specifically shown, it can reside separately from, or be integrated within the processor 102 or APD 116. The storage 106 includes a fixed or removable storage, for example, a hard disk drive, a solid state drive, an optical disk, or a flash drive.

The input devices 108 can include, without limitation, a keyboard, a keypad, a touch screen, a touch pad, a detector, a microphone, an accelerometer, a gyroscope, a biometric scanner, or a network adapter (e.g., a wireless local area network card for transmission and/or reception of wireless IEEE 802 signals). The output devices 119 can include, without limitation, a display, a speaker, a printer, a haptic feedback device, one or more lights, an antenna, or a network adapter (e.g., a wireless local area network card for transmission and/or reception of wireless IEEE 802 signals).

The input driver 112 communicates with the processor 102 the input devices 108, and the lens 123, and permits the processor 102 to receive input from the input devices 108 and the lens 123. The output driver 114 communicates with the processor 102 and the output devices 110, and permits the processor 102 to send output to the output devices 119.

It is noted that the input driver 112 and the output driver 114 are optional components, and that the image capturing device 110 operates in the same manner if the input driver 112 and the output driver 114 are not present. The output driver 114 includes an accelerated processing device (APD) 116 which is coupled to a display device 118. In one aspect, the display device 118 can be configured to provide a preview image prior to capturing an image. The display 118 can comprise various types of screens and can implement touch sensitive technologies.

The APD is configured to accept compute commands and graphics rendering commands from processor 102, to process those compute and graphics rendering commands, and to provide pixel output to display processor 102 for display. In one aspect, the APD 116 includes one or more parallel processing units configured to perform computations in accordance with a single-instruction-multiple-data (SIMD) paradigm that can assist with or benefit from the enhanced phase detection using the PDAF sensor 125. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein. The image signal processing described herein can also be performed by the APD 116.

In some implementations, the image capturing device 110 uses the components of the camera module 111 such as, for example, the lens 123 and the PDAF sensor 125 to extract left pixel data and right pixel data from the image data. In some implementations, the image capturing device 110 uses the components of the camera module 111, such as the lens 123 and the PDAF sensor 125, to extract a feature from the left pixel data (e.g., left phase detection pixels) and a feature from the right pixel data (e.g., right phase detection pixels) prior to determining a phase difference. In some implementations, the image capturing device 110 uses the components of the camera module 111 such as, for example, the lens 123 and the PDAF sensor 125 to determine the phase difference between a feature extracted from left pixel data and a feature extracted from right pixel data in an image feature domain. The phrase 'image feature domain' generally refers to an area of an image that includes data that forms an intended feature of the image. More specifically, the image feature domain comprises both the left pixel data and right pixel data that includes an intended feature of the image. A single large flower, for example, can be included in an image feature domain of an image that includes nothing else but green foliage. The image feature domain generally includes a feature that is to be extracted from left pixel data and a feature extracted from right pixel data, where irrelevant pixels are removed from the extracted features, and a true phase difference can be determined without the irrelevant pixel data compromising the phase difference determination.

Figure 2:
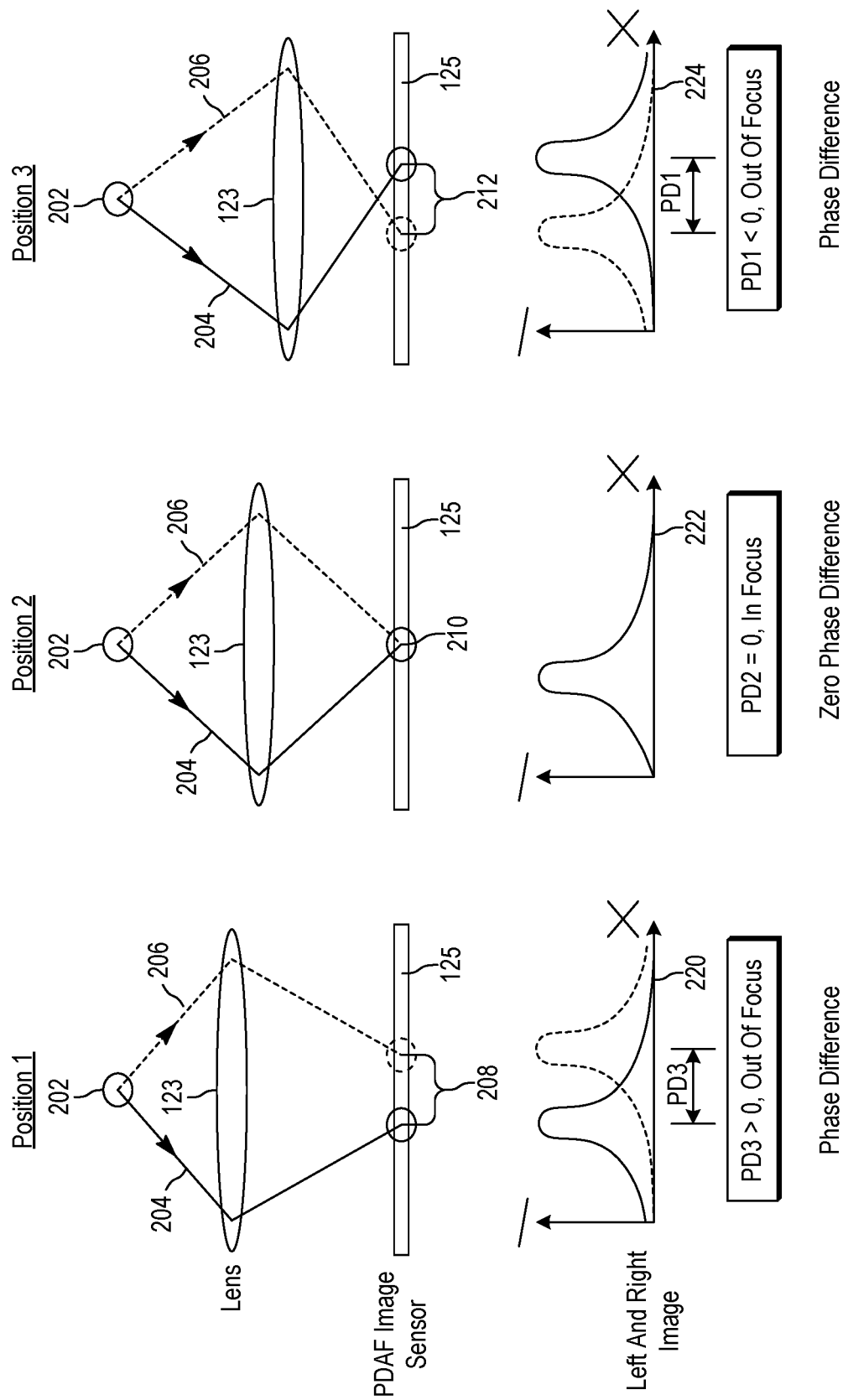
FIG. 2 sets forth a diagram of an example system for providing enhanced phase detection in an image capturing device with a lens at different positions to assist with phase detection autofocus in accordance with some implementations of the present disclosure.

For further explanation, FIG. 2 sets forth a diagram of an example system for providing enhanced phase detection in an image capturing device with a lens at different positions to assist with phase detection autofocus in accordance with some implementations of the present disclosure. That is, FIG. 2 depicts component an capturing device with a lens at different positions such as, for example, position 1, position 2, and position 3 to assist with phase detection autofocus in accordance with some implementations of the present disclosure.

For example, the image capturing device 110 can be directed toward a target object such as, for example, object 202. Position 1, position 2, and position 3 each represent a different lens position of the lens 123 from the PDAF sensor 125 (e.g., PDAF image sensor) in the image capturing device 110 in relation to an object 202 for capturing an image of the object 202. As depicted, position 1 and position 3 depict a phase difference while position 2 depicts zero phase difference. Phase difference, as used herein, can be the phase distance (PD) pixel distance between a left image (formed by left PD pixels) and a right image (formed by right PD pixels). When there is a change in the lens position of lens 123 for focusing, the phase difference changes. A large phase difference indicates a larger extent of lens defocus, such as, PD1 of position 1 and PD3 of position 3. It should be noted the PD1 and PD3 are arbitrary value/distance used herein for illustration purposes only to depict a phase difference of a certain value. PD 2 is used to depict "zero" phase difference or representing an "in-focus" image of the object 202. When the phase difference turns to zero such as, for example, as depicted in PD2 of position 2, the lens 123 can be at an "in-focus" position and can generate a focused image of the target object 202.

Using the lens 123 and the PDAF sensor 125 of the image capturing device 110 of FIG. 1, the autofocus functionality of the image capturing device 110 automatically moves or adjusts the lens 123 closer, as depicted in position 1, or moving the lens 123 farther away from the PDAF sensor 125, as depicted in position 3. In this way, left light rays 204 and right light rays 206 that reflect off the item or object 202 that the image capturing device 110 is attempting to capture strikes or makes contact at an identical point (e.g., a focal point) such as, for example, locations 208 of position 1, 210 of position 2, and 212 of position 3 on the PDAF sensor 125 as they travel through the lens 123.

As illustrated, in position 3, the left light rays 204 and right light rays 206 pass through the lens 123 and strike the PDAF sensor 125 at locations 212. Here, the lens 123 is too close to the object in relation to the PDAF sensor 125 creating a phase difference between the left and right images, as show on graph 220 that depicts the left light rays 204 and right light rays 206. The phase difference causes the object 202 to be out of focus.

In position 2, the left light rays 204 and right light rays 206 pass through the lens 123 and strike the PDAF sensor 125 at location 210, which is the intended focal point or "in-focus." Here, the lens 123 positioned at an appropriate distance to the object in relation to the PDAF sensor 125 and the lens 123 and correctly focused thereby eliminating any phase difference such as, for example, PD1 is equal to zero, as further depicted in graph 222 that depicts the left light rays 204 and right light rays 206. It should be noted that graph 222 depicts the left light rays 204 and right light rays 206 merged together showing an in-focus image.

In position 1, the left light rays 204 and right light rays 206 pass through the lens 123 and strike the PDAF sensor 125 at location 208. Here, the lens 123 is too far from the object in relation to the PDAF sensor 125 creating another phase difference between the left and right images. The phase difference is shown on graph 224 which depicts the left light rays 204 and right light rays 206. The phase difference causes the object 202 to be out of focus, as further depicted in graph 220. The phase difference at location 208 of position 3 and the phase difference at location 212 of position 1 between locations where the left light rays 204 and right light rays 206 strike the sensor 125 is the phase shift. The phase shift can be used to determine the autofocus phase shift and direction for the image capturing device 110.

Figure 3:
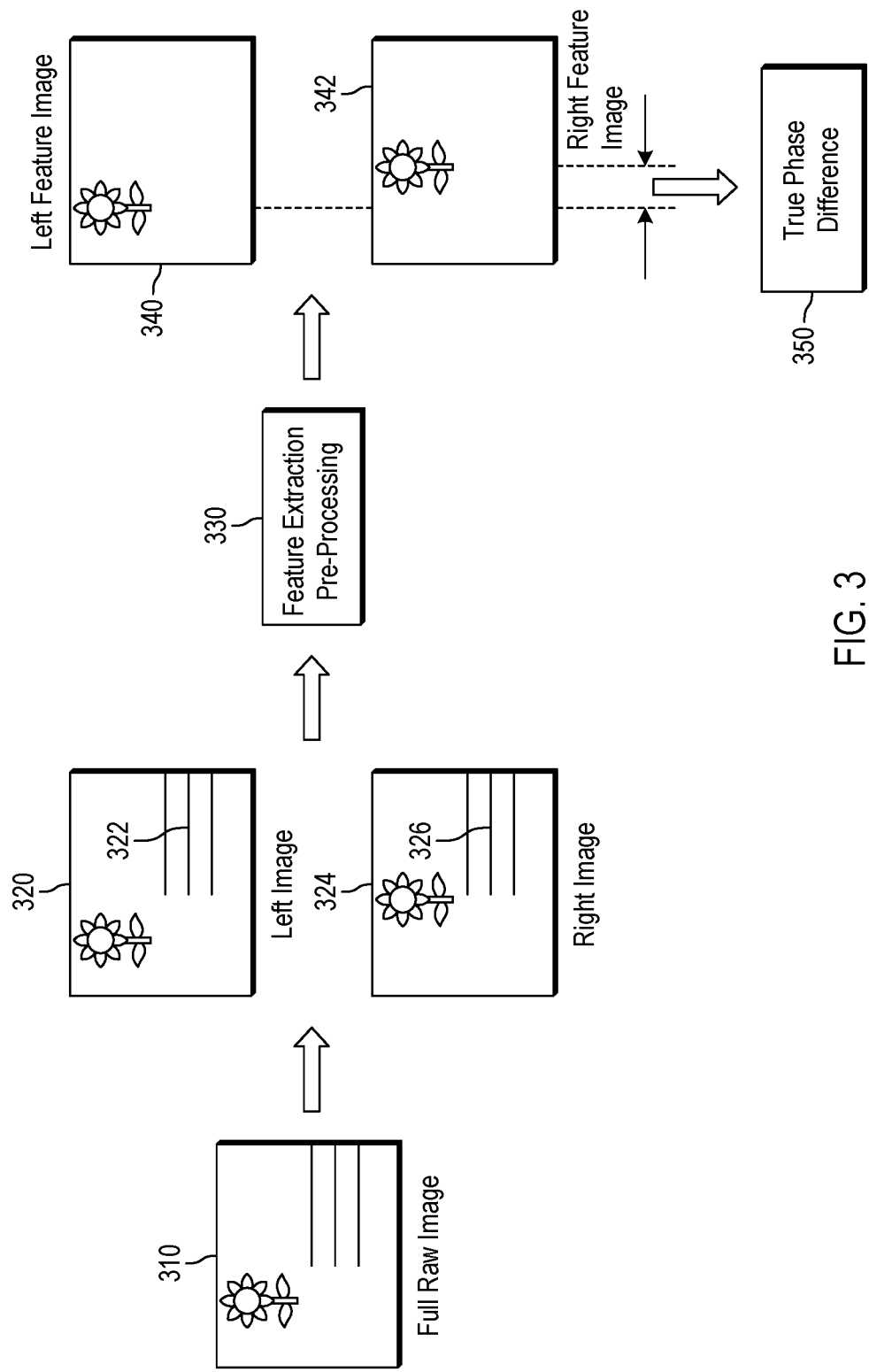
FIG. 3 sets forth a diagram of an example system for providing enhanced phase detection in an image feature domain using an image capturing device having phase detection autofocus devices in accordance with some implementations of the present disclosure.

For further explanation, FIG. 3 sets forth a block flow diagram of an example system for providing enhanced phase detection in an image feature domain using an image capturing device having phase detection autofocus devices in accordance with some implementations of the present disclosure. As shown, the various blocks of functionality are depicted with arrows designating the blocks' relationships with each other and to show process flow. Additionally, descriptive information is also seen relating each of the functional blocks of FIG. 3. As will be seen, many of the functional blocks can also be considered "modules" of functionality, in the same descriptive sense as has been previously described in FIG. 1. With the foregoing in mind, the blocks can also be incorporated into various hardware and software components of a system for providing enhanced phase detection in an image feature domain using an image capturing device having phase detection autofocus devices in accordance with the present invention. Many of the functional blocks can execute as background processes on various components, either in distributed computing components, or on the user device, or elsewhere.

Starting at image 310, the image 310 (e.g., a full raw image that has contains minimally processed data) can be captured by the image capturing device 110 of FIG. 1. The image capturing device 110 extracts left PD pixels 320 and right PD pixels 324 from the image data 310 (e.g., the full raw image). It should be noted that at this point, the left pixel data (or top pixel data) and the right pixel data (or bottom pixel data) can have unbalanced signal levels. For example, the left pixel data are brighter at the right side of the image and right pixel data is brighter at the left side. Because of the unbalanced nature of the signal levels, a matching operation or a left/right gain compensation per pixel is required to bring the left/right signal levels into balance.

However, as illustrated herein, the image capturing device 110, performs a pre-processing operation 330 (e.g., a feature extraction pre-processing operation), by executing a feature extraction operation of the left PD pixels 320 and right PD pixels 324 prior to performing a matching operation in an image feature domain. One or more irrelevant portions (imperfect compensation, flat areas, horizontal lines, etc.), such as irrelevant pixel data 322 and irrelevant pixel data 326, can be filtered using filter 124 and removed from the left PD pixels 320 and right PD pixels 324 extracted from the image data 310 in the image feature domain. In one aspect, the irrelevant pixel data 322 and irrelevant pixel data 326 can be low-contrast or low-textured images or small, irrelevant objects. Also, the irrelevant pixels can be removed to eliminate any bias in performing a matching operation.

By extracting features and removing the irrelevant pixel data 322 and irrelevant pixel data 326, matching operations are improved, especially for low-contrast, low-textured or small object scenes. Also, any need to perform a left/right gain compensation per pixel (e.g., phase difference compensation) is eliminated. The extracted features in a left feature image 340 and a right feature image 342 can be used to perform a left/right matching operation to determine and learn a phase difference between the left feature image 340 and the right feature image 342. A true phase difference 350 can be determined from the left feature image 340 and the right feature image 342.

Figure 4:
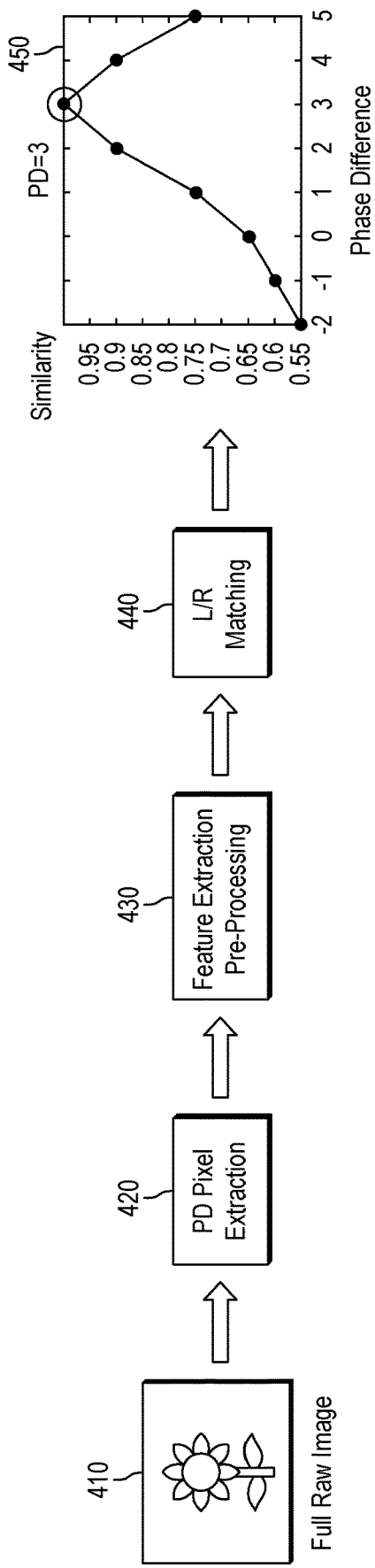
FIG. 4 sets forth a diagram of another example system for providing enhanced phase detection in an image capturing device having phase detection autofocus devices in accordance with some implementations of the present disclosure.

For further explanation, FIG. 4 sets forth a block flow diagram of an example system for providing enhanced phase detection in an image feature domain using an image capturing device having phase detection autofocus devices in accordance with some implementations of the present disclosure. As will be seen, many of the functional blocks can also be considered "modules" of functionality, in the same descriptive sense as has been previously described in FIGS. 1-4. Repetitive description of like elements employed in other implementations described herein is omitted for sake of brevity.

In one aspect, the image capturing device 110 of FIG. 1 can capture 410 image data (e.g., a full raw image). For example, the PDAF sensor 125 of FIG. 1 processes the image data captured through the lens 123. In one aspect, processor 102 can be an image processor capable of working with the PDAF sensor 125 to extract image data and perform enhanced phase detection autofocus operations as described herein.

In an additional aspect, the PDAF sensor 125, in association with processor 102, extracts 420 the phase detection pixels (e.g., PD pixel extraction) from the image data where the image data is captured from the image capturing device 110. In one aspect, the PDAF sensor 125 and the processor 102 can also execute instructions for calculating color values for phase detection pixels and for image generation based on phase detection pixel values and imaging pixel values.

The image capturing device 110 of FIG. 1, using the PDAF sensor 125, in association with processor 102, extracts 430 features from the phase detection pixels (e.g., from left PD pixels and right PD pixels) as a pre-processing operation. As part of the feature extraction, the filter 124, in association with processor 102, filters the phase detection pixels extracted from the image data to remove the irrelevant pixel data.

By removing the irrelevant pixel data and filtering the phase detection pixels, the PDAF sensor 125, in association with processor 102, provides left pixel data and right pixel data (or top pixel data and bottom pixel data) without the irrelevant pixel data that can bias a phase difference determination. The extracting can also include extracting a feature from the left pixel data and a feature from the right pixel data prior to determining the phase difference. In one aspect, the feature extraction can be performed using high/band-pass filters (e.g., a 1-dimensional high/band-pass filter) to remove the irrelevant pixels such as, for example, the flat areas and horizontal lines.

Subsequent to the pre-processing operation, the PDAF sensor 125, in association with processor 102, determines a phase difference between a feature extracted from left pixel data and a feature extracted from right pixel data in an image feature domain and match the one or more features of the left pixel data and a feature extracted from right pixel data based on the phase difference. More specifically, the PDAF sensor 125, in association with processor 102, performs left-right (L/R) matching 440 between a feature extracted from left pixel data and a feature extracted from right pixel data in an image feature domain.

As depicted in graph 450, a true, unbiased phase difference is determined such as, for example, a phase difference of "3." It should be noted that graph 450 depicts a degree of similarity on the y-axis and a phase difference on the x-axis. The values of graph 450 are arbitrary values and depicted for illustrated purposes only.

Thus, by applying the operations described herein such as, for example, in FIGS. 1-4, the need of using a per-pixel gain compensation operation is eliminated thereby providing enhanced computing efficiency and cost savings. Also, any offline calibration of a gain compensation can be eliminated, which saves time/resource cost in camera production.

Figure 5:
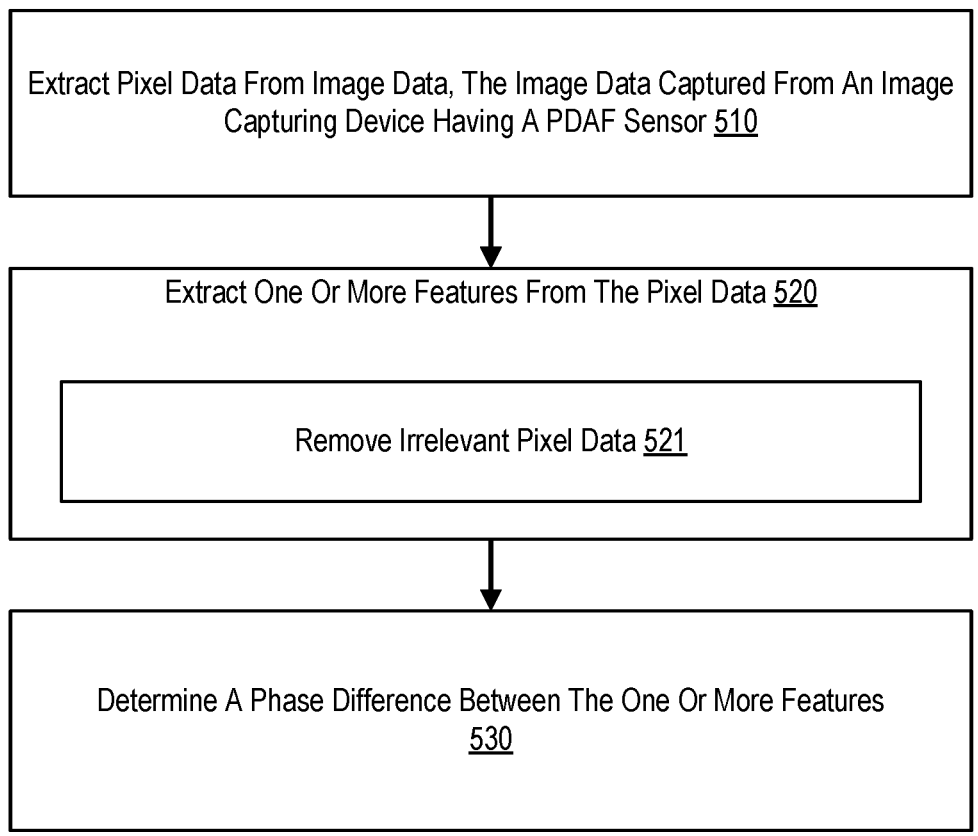
FIG. 5 sets forth a flow chart illustrating another example method of providing enhanced phase detection in an image capturing device having phase detection autofocus devices in accordance with some implementations of the present disclosure.

For further explanation, FIG. 5 sets forth a flow chart illustrating an example method of providing enhanced phase detection in an image capturing device having phase detection autofocus devices in accordance with some implementations of the present disclosure. The example method of FIG. 5 includes extracting 510 pixel data from image data. The image data is captured from an image capturing device having a PDAF sensor. For example, an image can be captured from the image capturing device 110 of FIG. 1 using the components of the camera module 111 such as the lens 123 and the PDAF sensor 125. The PDAF sensor can be used, in conjunction with the lens 123, to focus on an object of interest. The PDAF sensor 125, equipped with phase detection (PD) capabilities, can separate left and right light rays though the lens 123 in order to capture or 'sense' left and right images. The PDAF sensor 125 extracts the PDAF pixel data from the image data. In an additional aspect, the PDAF sensor 125, in association with the processor 102 (which can be an image signal processor) and the APD 116, extracts the PDAF pixel data from image data.

The example method of FIG. 5 also includes extracting 520 one or more features from the extracted pixel data. In the method of FIG. 5, extracting 420 features also includes removing 521 irrelevant pixel data. Removal of irrelevant pixel data is described below in greater detail. The PDAF sensor 125 can carry out the extraction process. Also, in some operations, the PDAF sensor 125, in association with the processor 102 (which can be an image signal processor) and the APD 116, can carry out the extraction of the features from the pixel data.

In one aspect, the operations for extracting the features from the pixel data can include, for example, performing an edge detection operation. Such edge detection can be performed on the left pixel data and the right pixel data acquired form the image capturing device 110 by identifying points at which the brightness of the left pixel data and the right pixel data changes or discontinues. The edge detection detects edge points on the left pixel data and the right pixel data. More specifically, the edge detection operation identifies regions of greater intensity variations are located such as, for example, the edge points of the left pixel data and the right pixel data. These points where the brightness changes can be organized into a set of line segments that can be referred to as "edges." The information on a detected edge of the left pixel data and the right pixel data is applied to a specific target object of the left pixel data and the right pixel data. In order to acquire the edge (e.g., edge point) data, a colormap can be used. The color map can be sorted in increasing order according to one of a variety of criteria such as, for example, hue variation, saturation variation, and intensity variation. Thus, the features extracted from the pixel data can be performed by edge detection.

The example method of FIG. 5 also includes determining 530 a phase difference between the one or more features of the pixel data extracted from the image data. In one aspect, the PDAF sensor 125 compares the extracted features of the pixel data, which was extracted from the image data. The difference in extracted feature image positions is used to determine a shift or phase difference to enable autofocus of the image capturing device 110 to determine the magnitude and direction of the movement of lens 123 for bringing a target image into focus. Thus, the extracted features (forming a pair of extracted features) from the left pixel data such as, for example, the left feature image 340 can be compared to the extracted features from and the right feature image 342 to determine the phase difference information or "true phase difference." In another aspect, the pair of extracted features (e.g., left feature image 340 and right feature image 342) can be referred to as phase detection extracted feature phase detection pixels.

Figure 6:
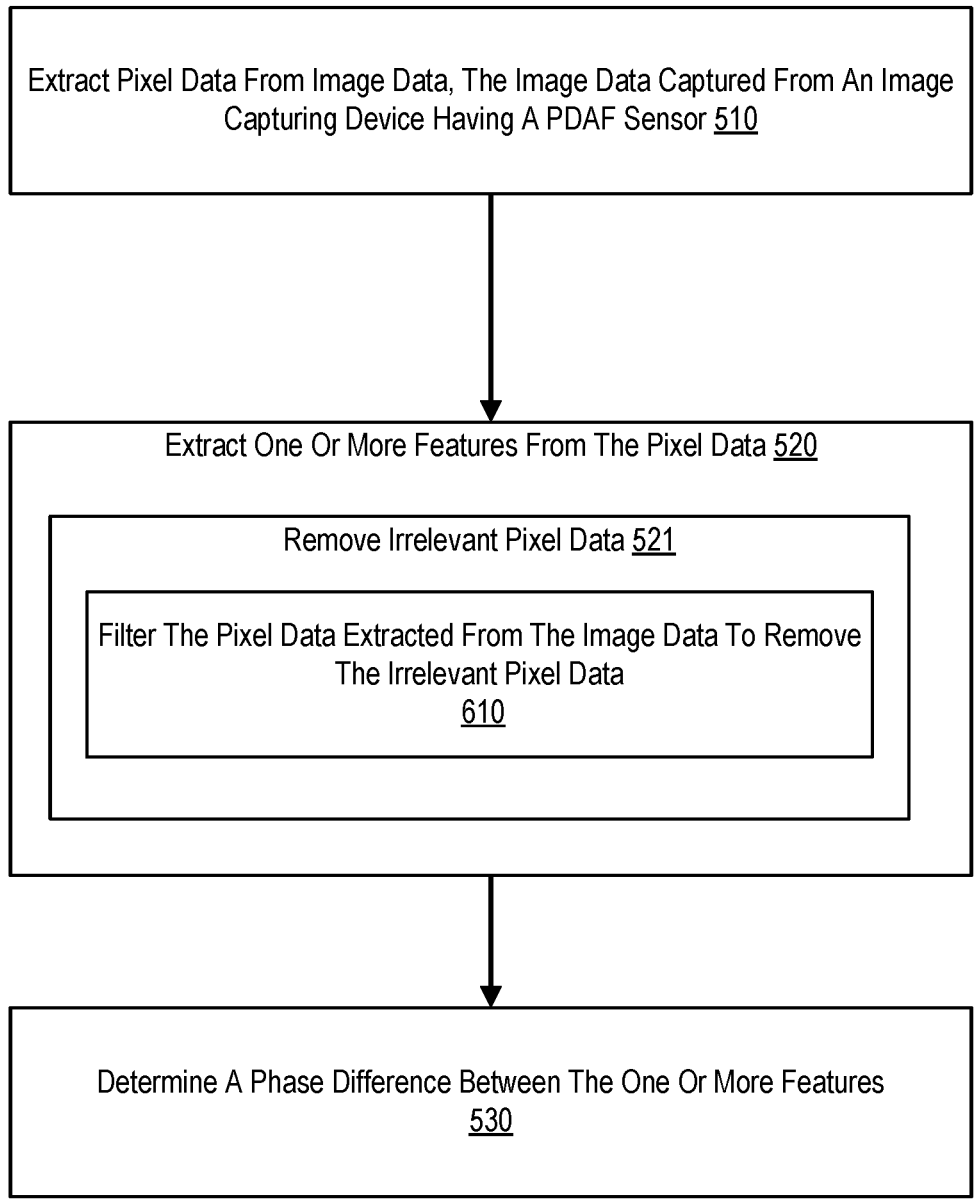
FIG. 6 sets forth a flow chart illustrating an example implementation of removing the irrelevant pixel data in accordance with some implementations of the present disclosure.

As mentioned above, extracting features from pixel data includes removal 521 of irrelevant pixel data. For further explanation, therefore, FIG. 6 sets forth a flow chart illustrating an example implementation of removing the irrelevant pixel data in accordance with some implementations of the present disclosure. In the method of FIG. 6, removing 521 irrelevant pixel data includes filtering 610 the pixel data extracted from the image data to remove the irrelevant pixel data. In one aspect, the filter 124, in association with processor 102, filters the phase detection pixels extracted from the image data to remove the irrelevant pixel data. The filter 124 performs the filtering using a 1-dimension (1D) high/band-pass filter to remove the irrelevant pixels. In another aspect, the filtering can occur using other types of filters. The irrelevant pixels can be noise or weak pixels for low-contrast or low-textured images or small, irrelevant objects. Also, the irrelevant pixels can be pixels with imperfect compensation, flat areas, or horizontal lines and can be removed to eliminate any bias matching result. In another aspect, the irrelevant pixels are those pixels that are not extracted identified using an edge detection operation. In one aspect, upon the phase detection pixels being extracted from the image data, the filter 124, for example, filters the irrelevant data. In another aspect, the filter 124, for example, filters the irrelevant data in conjunction with extracting the one or more features from the phase detection pixels.

Figure 7:
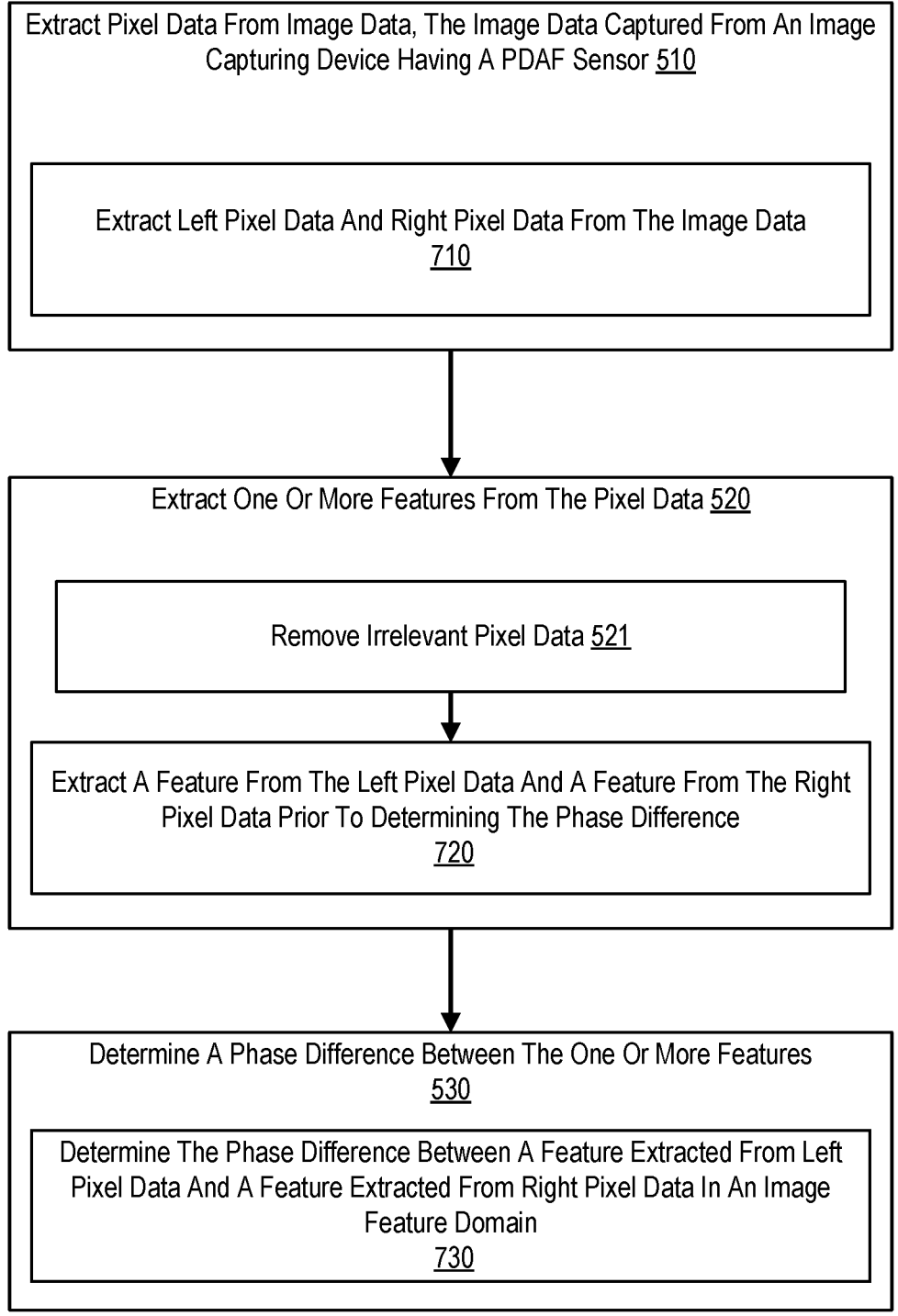
FIG. 7 sets forth a flow chart illustrating an example implementation of extracting pixel data from image data in accordance with some implementations of the present disclosure.

For further explanation, FIG. 7 sets forth a flow chart illustrating an example implementation of extracting pixel data from image data in accordance with some implementations of the present disclosure. In the method of FIG. 7, extracting 510 the pixel data also includes extracting 710 left pixel data and right pixel data from the image data. For example, the image capturing device 110 extracts left PD pixels 320 and right PD pixels 324 from the image data 310 (e.g., a full raw image). In one aspect, the PDAF sensor 125 extracts left pixel data and right pixel data from a raw image where the raw image is an image file containing minimally processed data from the image capturing devices. That is, the PDAF sensor can separate left and right light rays though the lens 123 of the image capturing device 110 to sense left and right images.

Also in the method of FIG. 7, extracting 520 features from the pixel data includes extracting 720 a feature from the left pixel data and a feature from the right pixel data prior to determining the phase difference. Such extraction of a feature is described above with respect to various edge techniques, but is applied here separately to the left and right pixel data.

The example method of FIG. 7 also includes determining 730 the phase difference between a feature extracted from left pixel data and a feature extracted from right pixel data in an image feature domain. In one aspect, the PDAF sensor 125, in association with the filter 124, determines a true or enhanced phase difference between the left extract feature image and a right extracted feature image without the irrelevant pixel data. This true or enhanced phase difference between the left extract feature image and a right extracted feature image can be used to determine a shift of a lens 123 for autofocus. By determining the true phase difference, which is determining the phase difference without the results being compromised by irrelevant pixel data, a left/right gain compensation is eliminated. The PDAF sensor 125 can, for example, determine a more accurate direction and more precise amount of position movement of the lens 123. In another aspect, the PDAF sensor 125 can, for example, more accurately determine the phase shifts between the left extract feature image and a right extracted feature image to determine spatial characterization or conversion values to convert the phase shifts to lens offsets.

Figure 8:
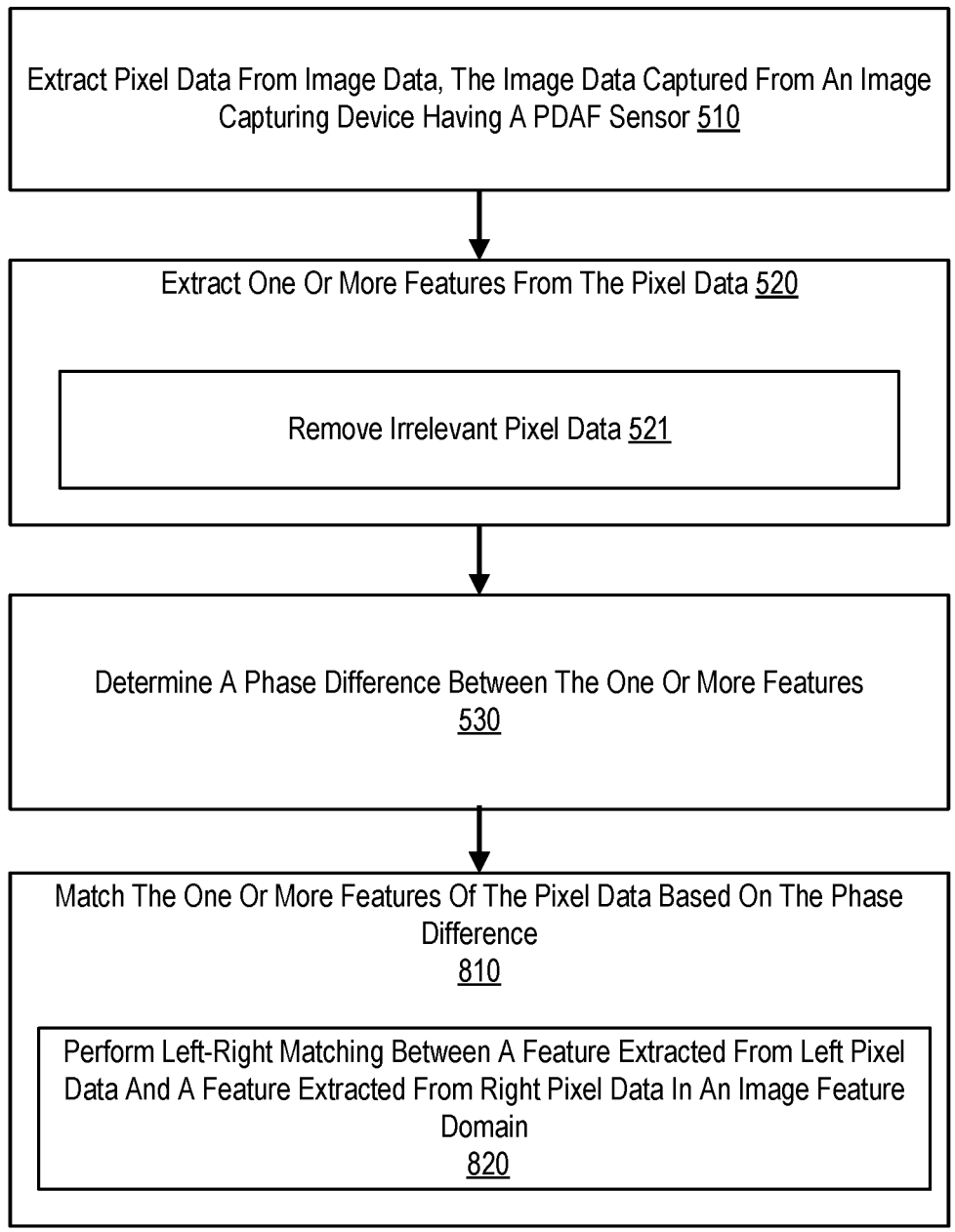
FIG. 8 sets forth a flow chart illustrating an example implementation of matching features of the pixel data in accordance with some implementations of the present disclosure.

Once the true phase difference is determined, a matching operation can be carried out. To that end, FIG. 8 sets forth a flow chart illustrating an example implementation of matching features of the pixel data in accordance with some implementations of the present disclosure. The example method of FIG. 8 includes matching 810 the one or more features of the pixel data extracted based on the phase difference. Such matching 810 can be carried out by performing 820 left-right matching between a feature extracted from left pixel data and a feature extracted from right pixel data in the image feature domain. In one aspect, the PDAF sensor 125, in association with the filter 124, matches the left extracted feature image and a right extracted feature image without the irrelevant pixel data (as the irrelevant data was removed 521). That is, a left/right matching operation can be performed in the image feature domain to determine a more accurate phase difference (a true phase difference) following the pre-processing operation of feature extraction, which also occurs in the image feature domain. In this way, by using the pre-processing operation in an image feature domain, any need for per-pixel gain compensation and offline calibration of gain compensation is eliminated.

In view of the foregoing, readers of skill in the art will appreciate that implementations in accordance with the present disclosure offer a number of advantages. Implementations provide applications or operations of an image capturing devices to execute a pre-processing operation in an image feature domain to eliminate the need for per-pixel gain compensation and offline calibration of gain compensation. In this way, the user experience is improved.

Implementations allow memory-local computing to be used efficiently for atomic operations, which can improve performance for a range of important workloads (e.g., graph analytics, sparse matrix algebra, machine learning, etc.). Such applications can take advantage of cache locality when available, and dynamically identify coalescing opportunities to enable more efficient multi-module memory-local processing operations.

Implementations can be a system, an apparatus, a method, and/or logic circuitry. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method of providing enhanced phase detection, the method comprising:
    extracting pixel data from image data, the image data captured from an image capturing device having a phase detection autofocus (PDAF) sensor;
    extracting one or more features from the pixel data, including removing irrelevant pixel data, wherein removing irrelevant pixel data further comprises filtering the pixel data extracted from the image data using one or more of a high-pass filter or a band-pass filter; and
    determining a phase difference between the one or more features.

2. The method of claim 1, wherein the high-pass filter or the band-pass filter comprises a 1-dimensional filter.

3. The method of claim 1, wherein extracting the pixel data from the image data further comprises extracting left pixel data and right pixel data from the image data.

4. The method of claim 3, wherein extracting the one or more features from the pixel data further comprises extracting a feature from the left pixel data and a feature from the right pixel data prior to determining the phase difference.

5. The method of claim 1, wherein determining the phase difference further comprises determining the phase difference between a feature extracted from left pixel data and a feature extracted from right pixel data in an image feature domain.

6. The method of claim 1, further comprising matching the one or more features of the pixel data based on the phase difference.

7. The method of claim 1, further comprising performing left-right matching between a feature extracted from left pixel data and a feature extracted from right pixel data in an image feature domain.

8. An apparatus for providing enhanced phase detection, the apparatus comprising a computer processor, a computer memory operatively coupled to the computer processor, the computer memory having disposed therein computer program instructions that, when executed by the computer processor, cause the apparatus to carry out:
    extracting pixel data from image data, the image data captured from an image capturing device having a phase detection autofocus (PDAF) sensor;
    extracting one or more features from the pixel data, including removing irrelevant pixel data, wherein removing irrelevant pixel data further comprises filtering the pixel data extracted from the image data using one or more of a high-pass filter or a band-pass filter; and
    determining a phase difference between the one or more features.

9. The apparatus of claim 8, wherein the high-pass filter or the band-pass filter comprises a 1-dimensional filter.

10. The apparatus of claim 8, wherein extracting the pixel data from the image data further comprises extracting left pixel data and right pixel data from the image data.

11. The apparatus of claim 10, wherein extracting the one or more features from the pixel data further comprises extracting a feature from the left pixel data and a feature from the right pixel data prior to determining the phase difference.

12. The apparatus of claim 8, wherein determining the phase difference further comprises determining the phase difference between a feature extracted from left pixel data and a feature extracted from right pixel data in an image feature domain.

13. The apparatus of claim 8, further comprising computer program instructions that, when executed, cause the apparatus to carry out matching the one or more features of the pixel data based on the phase difference.

14. The apparatus of claim 8, further comprising computer program instructions that, when executed, cause the apparatus to carry out performing left-right matching between a feature extracted from left pixel data and a feature extracted from right pixel data in an image feature domain.

15. A non-transitory computer readable medium for providing enhanced phase detection, the non-transitory computer readable medium comprising computer program instructions that, when executed, cause a computer to carry out:
    extracting pixel data from image data, the image data captured from an image capturing device having a phase detection autofocus (PDAF) sensor;
    extracting one or more features from the pixel data, including removing irrelevant pixel data, wherein removing irrelevant pixel data further comprises filtering the pixel data extracted from the image data using one or more of a high-pass filter or a band-pass filter; and determining a phase difference between the one or more features.

16. The non-transitory computer readable medium of claim 15, wherein the high-pass filter or the band-pass filter comprises a 1-dimensional filter.

17. The non-transitory computer readable medium of claim 15, wherein extracting the pixel data from the image data also includes:

extracting left pixel data and right pixel data from the image data; and extracting a feature from the left pixel data and a feature from the right pixel data prior to determining the phase difference.

18. The non-transitory computer readable medium of claim 15, wherein determining the phase difference further comprises determining the phase difference between a feature extracted from left pixel data and a feature extracted from right pixel data in an image feature domain.

19. The non-transitory computer readable medium of claim 15, further comprising computer program instructions that, when executed, cause the computer to carry out matching the one or more features of the pixel data based on the phase difference.

20. The non-transitory computer readable medium of claim 15, further comprising computer program instructions that, when executed, cause the computer to carry out performing left-right matching between a feature extracted from left pixel data and a feature extracted from right pixel data in an image feature domain.

* * * * *